Patented Jan. 6, 1953

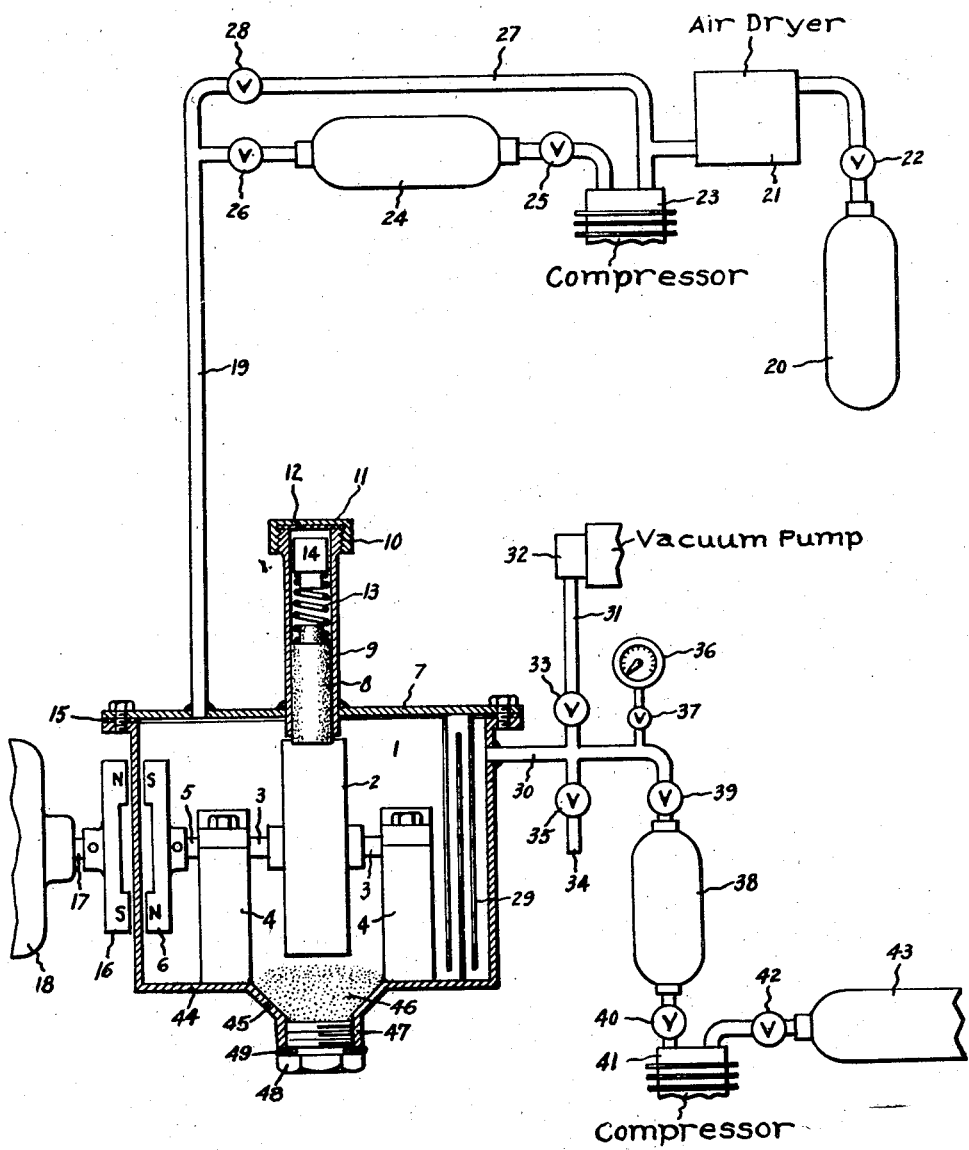

2,624,421

UNITED STATES PATENT OFFICE 2,624,421

MACHINE AND METHOD FOR PURIFYING THE INERT GASES

Robert H. Savage, Scotia, N. Y., assignor to General Electric Company, a corporation of New York Application August 12, 1948, Serial No. 43,855

24 Claims. (Cl. 183—4.3)

My invention relates to the purification of the inert gases and more particularly to a machine and method for removing from the inert gases, traces or appreciable quantities of gases other than the rare gases.

The subject matter of this application is closely related to the subject matter contained in my copending application, Serial No. 43,854 filed concurrently herewith entitled "Chemically Active Graphitic Carbon Powder and Apparatus for Making Same" and copending divisional applications of the above application, Serial No. 102,213, entitled "Process of Making Chemically Active Graphite Carbon Powder" and Serial No. 102,214, entitled "Chemically Active Graphitic Carbon Powder," all assigned to the same assignee as the present invention.

In the production of the inert gases, the methods of which are well known in the art, it is very difficult to produce the final product free of such impurities as hydrogen, nitrogen, methane, CO, $CO_2$, oxygen, and others. In an effort to purify the inert gases many procedures and machines have been developed. One of these is the adsorption method which utilizes activated charcoal at low temperatures.

The impurity that is most difficult to remove from the inert gases is nitrogen and is primarily so because nitrogen is a relatively inactive gas. Activated charcoal not only adsorbs nitrogen but also adsorbs some of the inert gases and one of the inert gases adsorbed is argon. Thus, the problem of separation of nitrogen from argon is a good example. The adsorption of the nitrogen by the activated charcoal only takes place at low temperatures and does not effect a quantitative separation of nitrogen from argon because the adsorption is physical (non-chemical) in nature and does not easily distinguish between two gases having boiling points as close together as are those of nitrogen and argon. After the adsorption of nitrogen and argon by the activated charcoal, fractional distillation must be resorted to in order to separate the two gases. With the development of such a product as the chemically active graphite referred to in my copending applications mentioned above, the possibilities of purification of the rare inert gases are greatly enhanced. The method and machine for the production of these fine chemically active particles is fully described and claimed in my copending applications referred to above. It has been found that at room temperatures these particles of chemically active graphite selectively and irreversibly adsorb nitrogen in the presence of argon at the rate of 0.2 cc. per gram (STP), leaving the argon unaffected; whereas in the physical adsorption by chilled charcoal, both nitrogen and argon are adsorbed and fractional separation by distillation is required.

Although methods exist for the selective adsorption of hydrogen, these methods have very low rates of adsorption. It has been found that the particles of chemically active graphite selectively and irreversibly adsorb hydrogen at the rate of about 2 cc. (STP) per gram of chemically active graphite and this rate of adsorption is many times greater than the rate of adsorption of any other known carbon. These chemically active graphite particles will, in the presence of inert gases, selectively and irreversibly adsorb gases such as methane, CO, $CO_2$, oxygen, and others.

Thus, one of the objects of my invention is to provide a new machine and a new method for the purification of the inert gases.

Another object of my invention is to provide a machine and a method for the purification of the inert gases at ordinary room temperatures.

Another object of my invention is to provide a machine and a method for extracting traces of hydrogen, nitrogen, methane, CO, $CO_2$, $O_2$ and other gases from the inert gases.

Further objects and advantages of my invention will become apparent as the following description proceeds and the features of novelty which characterize my invention will be pointed out with particularity in the claims annexed to and forming a part of this specification.

In the drawing, Fig. 1 is a semi-diagrammatical illustration of the system and machine embodying the essentials of my invention and serving as the basis of my claims hereinafter set forth.

In Fig. 1, I have shown a gas-tight chamber 1 within which is located a rotatably mounted comminuting wheel 2. The comminuting wheel is mounted by trunnions 3 which are supported by two bearing block standards 4. One of the trunnions is extended beyond its standard and is shown as shaft 5 to which is coupled one-half of a magnetic coupling 6 which is also contained within the gas-tight chamber 1. Mounted on wall 7 of chamber 1 are the guide and feed means for directing a graphite rod 8 against the surface of the comminuting wheel 2. The guide means is shown as consisting of a collar 9 which is welded on to wall 7 so that the joint will be gas tight. Collar 9 extends past wall 7 into chamber 1 so as to better guide the graphite rod 8 after it has been reduced in length during operation of the machine. The collar 9 is threaded 10 at its outside so as to receive an end cap 11, and a resilient gasket 12 is provided to make the joint gas tight. Within the collar 9 and cooperating with the graphite rod 8 are a spring 13 and a weight 14 for exerting a constant pressure on the graphite rod. Since wall 7 of the chamber is removable a resilient gasket 15 is provided to make the joint gas tight.

The second half of the magnetic coupling 16 is outside chamber 1 and is mounted on the shaft 17 of a drive motor 18. Ported to the chamber 1 by means of gas-tight line 19 is the impure gas system whose elements will now be described. The impure gas, which is the ordinary commercial product, comes in tanks or bombs. I have shown a container 20 for impure gas connected to a drier 21 and separated by a valve 22. The gas leaving the drier 21 is compressed by a pump or compressor 23 and is stored in gas tank 24 whose inlet and outlet are both controlled by valves 25 and 26. A by-pass system 27 is provided directly from the drier 21 to the gas-tight chamber 1 with a valve 28 interposed in the line. Within the chamber 1 is provided a set of baffle plates 29 for the purpose of providing a maze which will prevent the moving gas from transporting out of the chamber the fine wear-dust particles located therein.

Ported to the chamber 1 by means of a gas-tight line 30 is a gas-tight system which is used both for evacuating chamber 1 and also for collecting the purified rare inert gases. I have shown a branch of this system 31 leading to a vacuum pump 32 and a valve 33 for closing off this branch of the gas line. I have also shown a purging outlet 34 and a valve 35 interposed between it and the gas line 30. A pressure gage 36 and a valve 37 are provided for measuring the pressure within the system. A reservoir 38 for the purified gas is provided in the gas-tight system and valve 39 is interposed between the tank and the remainder of the gas system. Connected to the reservoir 38 for the purified gas is a pump or compressor 41 and a valve 42 is supplied at the outlet of the pump 41 said valve 42 being adapted to fit gas bottles 43 which are to be filled with the compressed purified rare inert gas.

The base surface 44 of the gas-tight chamber is shaped so as to form a conical section 45 below the comminuting wheel which serves as a means of collecting the chemically active graphitic carbon powder 46 which is produced within the chamber. Threaded to the cylindrical extension 47 of conical section 45 is a plug 48, which seals chamber 1. Removal of plug 48 provides a means of cleaning out the graphitic carbon powder from the gas-tight chamber. A resilient gasket 49 is provided to keep the joint between members 48 and 47 gas-tight.

A number of modes of operation of the machine are possible and a number of these modes are described herein. In the first, all the valves in the two gas-tight piping systems are closed except valve 33. The vacuum pump 32 is operated to evacuate chamber 1 after which valve 33 is closed. Then valves 22 and 25 are opened and the incoming impure rare inert gas is dried in drier 21, is recompressed by compressor 23, and is stored in tank 24. Whereupon, the valves are closed and valves 26 and 39 are opened and are carefully adjusted so as to control the flow of gas through chamber 1. Simultaneously with this, or at some time previous to the opening of valves 26 and 39, the comminution process is begun by starting up motor 18 and by transmitting the rotary motion to the comminuting surface 2 via the magnetic clutch. The graphite, when bearing upon a rotating surface located in an evacuated chamber or in a chamber filled with a non-lubricating gas, seizes and is comminuted to form the chemically active graphitic carbon powder described and claimed in my copending application referred to above. A non-lubricating gas is one in whose presence graphite lubrication will not take place and such non-lubricating gases are dry air, or a dry gas of the inert gas group (e. g. argon).

The chemically active graphitic carbon powder adsorbs the traces or small amounts of the impurities such as hydrogen and nitrogen which are mixed with and contaminate the inert gas. As was described hereinbefore this adsorption is irreversible and the purified gas is now passed through the maze formed by the plurality of baffle plates 29 which serve to settle out the particles of graphite that are carried along by the gas and then the purified gas is captured in reservoir 38. After valve 39 is closed valves 40 and 42 are opened and the compressor pumps the gas from tank 38, compresses it, and stores it ready for use in suitable containers such as tank 43.

A variation of this method is to purge chamber 1 with the impure gas. To do this valves 35 and 26 are opened and some of the high pressure, dry, impure gas stored in tank 24 is permitted to enter and purge chamber 1 by driving out the gases located therein. After the system is purged of the residual gases that were in chamber 1 the valves are closed and the process that was described above is begun.

If the source of impure gas is pressurized, then the compressor 23 and pressurized storage tank 24 may be by-passed. In that way the dried gas passes through line 27 directly to chamber 1 where it is purified and is then extracted through line 30. The purified gas system may be varied by either eliminating tank 38 and directly compressing the purified product or by eliminating compressor 41 and storage tank 43, and by capturing and storing the purified gas in reservoir 38. Also, by operating both compressors 23 and 41, and by having a multiplicity of inlet and outlet connections the process can be made continuous. The process can be regulated so as to purify only a certain amount of gas by varying the amount of gas permitted to enter chamber 1 and by operating the compressors so that only a certain amount of gas enters and leaves chamber 1.

To replenish the supply of graphite, all the valves are closed, cap 12 is taken off and weight 14 and spring 13 are removed. A new stick of graphite is inserted in collar 9 and all the parts are reassembled.

While I have shown a particular embodiment of my invention, it will be understood, of course, that I do not wish to be limited thereto since many modifications may be made, and I therefore contemplate by the appended claims to cover any modifications as fall within the true spirit and scope of my invention.

What I claim as new and desire to secure by Letters Patent of the United States is:

1. A method for removing from the inert gases impurities contained therein, consisting of gases other than the inert gases, comprising the step of subjecting the gas mixture to activated adsorption by chemically active, selectively adsorptive, ultra-fine graphite particles.

2. A method for removing other gases from the inert gases comprising the steps of drying the gas mixture, and then subjecting the gas mixture to activated adsorption by chemically active ultra-fine graphite particles.

3. A method for separating relatively pure inert gases from mixtures containing gases other than the inert gases, comprising the steps of drying the gas mixture, subjecting the gas mixture to activated adsorption by chemically active ultra-fine graphite particles, passing the gas through a maze of passages, and capturing the purified gas in a container.

4. A method for separating relatively pure inert gases from mixtures containing gases other than the inert gases, comprising the steps of drying the gas mixture, subjecting the gas mixture to activated adsorption at a controlled pressure by chemically active ultra-fine graphite particles, compressing the purified gas and storing it in pressurized containers.

5. A method for separating relatively pure inert gases from mixtures containing gases other than the inert gases comprising the steps of subjecting the gas mixture at sub-atmospheric pressure to activated adsorption by chemically active ultra-fine graphite particles, and then compressing the purified gas and storing it in pressurized containers.

6. A method for removing gaseous impurities from mixtures of the inert gases containing such impurities comprising the steps of evacuating a gas-tight chamber, comminuting graphite within said chamber in the presence of a nonlubricating gas so as to produce chemically active ultra-fine graphite particles capable of activated adsorption, and contacting said comminuted graphite with the impure inert gas mixture whereby the impurities in said gas mixture are subjected to activated adsorption by said comminuted graphite.

7. A method for purifying a mixture of the inert gases containing as impurities, gases other than the inert gases, comprising the steps of evacuating a gas-tight chamber, comminuting graphite within said chamber in the presence of a nonlubricating gas, drying the impure inert gas, and contacting said comminuted graphite with the impure inert gas mixture whereby the impurities of said gas mixture are subjected to activated adsorption by said comminuted graphite.

8. A method for purifying a mixture of the inert gases containing as impurities gases other than the inert gases, comprising the steps of evacuating a gas-tight chamber, then comminuting graphite within said chamber in the presence of a nonlubricating gas so as to produce chemically active ultra-fine graphite particles, then drying the impure inert gas, bleeding the impure gas into the purifying chamber at a controlled gas pressure, maintaining the flow of the gas through the chamber so that it comes into contact with the chemically active ultra-fine graphite particles produced by the comminution process and the impurities are removed from the gas by adsorption on the graphite.

9. A method for purifying a mixture of the inert gases containing as impurities gases other than the inert gases, comprising the steps of evacuating a gas-tight chamber, then comminuting graphite within said chamber in the presence of a nonlubricating gas so as to produce chemically active ultra-fine graphite particles, then drying the impure inert gas, bleeding the impure gas into the purified chamber at a controlled sub-atmospheric gas pressure, maintaining the flow of the gas through the chamber so that it comes into contact with the chemically active ultra-fine graphite particles produced by the comminution process whereby impurities in the gas are removed therefrom by adsorption on the graphite, passing the gas through a maze of passages, and then capturing the purified gas in a container.

10. A method for purifying a mixture of the inert gases containing as impurities, gases other than the inert gases, comprising the steps of evacuating a gas-tight chamber, then comminuting graphite within said chamber in the presence of a nonlubricating gas so as to produce chemically active ultra-fine graphite particles, then drying the impure inert gas, bleeding the impure gas into the purified chamber at a controlled sub-atmospheric gas pressure, maintaining the flow of the gas through the chamber so that it comes into contact with the chemically active ultra-fine graphite particles produced by the comminution process, separating the impurities from the gas mixture by activated adsorption on the graphite, passing the gas through a maze of passages, capturing the purified gas in a container, and then compressing the purified gas and storing it in pressurized containers.

11. A method for purifying the inert gases comprising the steps of drying the impure inert gas, compressing the dried gas, bleeding the impure gas at a controlled pressure into a gas-tight purifying chamber containing chemically active ultra-fine graphite particles whereby said gas is subjected to activated adsorption, and maintaining the flow of the gas through said chamber so that all the gas comes into contact with the chemically active graphite particles whereby impurities in the gas are removed by adsorption on the graphite.

12. A method for purifying the inert gases comprising the steps of drying the impure inert gas, compressing the dried gas, bleeding the impure gas at a controlled pressure into a gas-tight purifying chamber containing chemically active ultra-fine graphite particles whereby said gas is subjected to activated adsorption, maintaining the flow of the gas through said chamber so that all the gas comes into contact with the chemically active graphite particles, separating the impurities from the gas mixture by adsorption on the graphite, and then compressing the purified gas and storing it in pressurized containers.

13. A method for purifying the rare inert gases comprising the steps of drying the impure inert gas, bleeding the impure gas at a controlled sub-atmospheric pressure into a gas-tight purifying chamber containing chemically active ultra-fine graphite particles whereby said gas is subjected to activated adsorption, maintaining the flow of the gas through said chamber so that all the gas comes into contact with the chemically active graphite particles, separating the impurities from the gas mixture by adsorption on the graphite, passing the gas through a maze of passages, capturing the purified gas in a container, and then compressing the purified gas and storing it in pressurized containers.

14. A method for purifying a mixture of the rare inert gases containing as impurities gases other than the inert gases comprising the steps of purging a gas-tight purifying chamber with a nonlubricating dry inert gas, then comminuting graphite in the presence of said nonlubricating gas so as to produce chemically active ultra-fine graphite particles, bleeding the impure gas at a controlled pressure into the purifying chamber, separating the impurities from the gas mixture by adsorption on the graphite, and maintaining the flow of the gas through the chamber so that all the gas comes into contact with the chemically active ultra-fine graphite particles produced by the comminution process.

15. A method for purifying a mixture of the rare inert gases containing as impurities gases other than the inert gases comprising the steps of purging a gas-tight purifying chamber with a nonlubricating dry inert gas, then comminuting graphite in the presence of said nonlubricating gas so as to produce chemically active ultra-fine graphite particles, bleeding the impure gas at a controlled pressure into the purifying chamber, separating the impurities from the gas mixture by adsorption on the graphite, maintaining the flow of the gas through the chamber so that all the gas comes into contact with the chemically active ultra-fine graphite particles produced by the comminution process, passing the purified gas through a maze of passages, and then storing the purified gas in a container.

16. A method for purifying a mixture of the rare inert gases containing as impurities gases other than the inert gases, comprising the steps of drying the impure inert gas, compressing the dried gas, storing the compressed dried gas in a tank, then purging a gas-tight purifying chamber with the compressed inert gas, then comminuting graphite within said purifying chamber in the presence of said dried gas so as to produce chemically active ultra-fine graphite particles, then bleeding the impure gas at sub-atmospheric pressure into the purifying chamber, separating the impurities from the gas mixture by adsorption on the graphite, and maintaining the flow of the gas through the chamber so that it comes into contact with the chemically active graphite particles contained within said chamber.

17. A method for purifying a mixture of the rare inert gases containing as impurities gases other than the inert gases, comprising the steps of drying the impure inert gas, compressing the dried gas, storing the compressed dried gas in a tank, then purging a gas-tight purifying chamber with compressed inert gas, then comminuting graphite within said purifying chamber in the presence of said dried gas so as to produce chemically active ultra-fine graphite particles, then bleeding the impure gas into the purifying chamber, separating the impurities from the gas mixture by adsorption on the graphite, maintaining the flow of the gas through the chamber so that it comes into contact with the chemically active graphite particles contained within said chamber, then passing the gas through a maze of passages, and then storing the gas in containers.

18. A method for purifying the inert gases comprising the steps of purging a gas-tight purifying chamber with a nonlubricating gas, then introducing chemically active ultra-fine graphite particles into said purifying chamber, and then bringing the impure inert gas into contact with said chemically active ultra-fine graphite particles within said chamber whereby said gas is subjected to activated adsorption and the impurities are separated therefrom.

19. A method for purifying a mixture of the inert gases containing as an impurity gases other than the inert gases comprising the steps of comminuting graphite in the presence of a nonlubricating gas so as to produce chemically active ultra-fine graphite particles, and then contacting said graphite particles with the impure gas whereby said gas is subjected to activated adsorption on said particles and the impurities are separated therefrom.

20. A machine for removing gaseous impurities from the inert gases comprising a gas-tight housing, comminuting means for comminuting graphitic carbon mounted within said housing, means for evacuating said housing, means for introducing the inert gas to be purified into said housing whereby said impure gas comes into contact with the comminuted graphite, and means for collecting the purified inert gas.

21. A machine for removing gaseous impurities from inert gases comprising a gas-tight housing, comminuting means for comminuting graphitic carbon mounted within said housing, means for purging said housing with the inert gas whereby said housing becomes filled with only the inert gas, means for feeding the inert gas to be purified into said housing whereby said impure gas comes into contact with the comminuted graphite, and means for collecting the purified inert gas.

22. A machine for removing gaseous impurities from the inert gases comprising a gas-tight housing, comminuting means for comminuting graphitic carbon mounted within said housing, means for evacuating said housing, means for feeding the inert gas to be purified into said housing whereby said impure gas comes into contact with the comminuted graphite, means for separating the purified inert gas from the products of comminution, and means for collecting the purified inert gas.

23. A machine for removing gaseous impurities from the inert gases comprising a gas-tight housing, comminuting means for comminuting graphitic carbon mounted within said housing, means for evacuating said housing, means for feeding the inert gas to be purified into said housing whereby said impure gas comes into contact with the comminuted graphite, means comprising a maze for separating the purified inert gas from the products of comminution, and means for collecting the purified inert gas.

24. A machine for removing gaseous impurities from the inert gases comprising a gas-tight housing, comminuting means for comminuting graphitic carbon mounted within said housing, means for purging said housing with the inert gas whereby said housing becomes filled with only the inert gas, means for feeding the inert gas to be purified into said housing whereby said impure gas comes into contact with the comminuted graphite, means for separating the purified inert gas from the products of comminution, and means for collecting the purified inert gas.

ROBERT H. SAVAGE.

REFERENCES CITED

The following references are of record in the file of this patent:

UNITED STATES PATENTS

| Number | Name | Date |
|---|---|---|
| 1,782,493 | Van Loon | Nov. 25, 1930 |
| 1,937,446 | Stampe | Nov. 28, 1933 |
| 2,019,632 | Ray | Nov. 5, 1935 |
| 2,037,685 | Holden | Apr. 14, 1936 |
| 2,386,366 | Storment | Oct. 9, 1945 |

OTHER REFERENCES

"Charcoal As An Adsorbent," by Garner, Natural Gas, vol. No. 11 of November 1924, page 48.

"Adsorption," by Mantell, Chemical Engineering Series 1945, McGraw-Hill Book Co. Inc., New York.

"Industrial Carbon," by Mantell, 2d. Ed., 1946, D. Van Nostrand Co. Inc., New York.